(12) United States Patent  (10) Patent No.: US 8,651,457 B2
Peterman                    (45) Date of Patent:     Feb. 18, 2014

(54) HEATER SYSTEM MEDIA BED FLOAT SLED AND METHOD OF USING THE SAME

(75) Inventor: John M. Peterman, Weldon Spring, MO (US)

(73) Assignee: Gillespie + Powers, Inc., St. Louis, MO (US)

( * ) Notice: Subject to any disclaimer, the term of this patent is extended or adjusted under 35 U.S.C. 154(b) by 231 days.

(21) Appl. No.: 13/193,266

(22) Filed: Jul. 28, 2011

(65) Prior Publication Data

US 2012/0023724 A1    Feb. 2, 2012

Related U.S. Application Data

(60) Provisional application No. 61/369,341, filed on Jul. 30, 2010.

(51) Int. Cl.
    *B66F 7/26*    (2006.01)
(52) U.S. Cl.
    USPC ............. 254/2 B; 254/89 H; 254/93 HP
(58) Field of Classification Search
    USPC ............. 254/2 B, 89 H, 93 HP, 10 B
    See application file for complete search history.

(56) References Cited

U.S. PATENT DOCUMENTS

| | | | |
|---|---|---|---|
| 3,592,285 A * | 7/1971 | Noble | 180/124 |
| 3,610,364 A | 10/1971 | Snoeyenbos | |
| 3,752,331 A | 8/1973 | Colburn | |
| 3,796,279 A * | 3/1974 | Burdick et al. | 180/124 |
| 3,828,884 A * | 8/1974 | Burdick | 180/125 |
| 3,831,708 A | 8/1974 | Terry | |
| 3,994,474 A * | 11/1976 | Finkbeiner | 254/88 |
| 4,417,639 A | 11/1983 | Wegener | |
| 4,815,926 A | 3/1989 | Chaffee et al. | |
| 5,121,900 A | 6/1992 | McDonald | |
| 5,129,778 A | 7/1992 | Harp | |

(Continued)

FOREIGN PATENT DOCUMENTS

| EP | 0503788 A1 | 9/1992 |
|---|---|---|
| EP | 0508447 A2 | 10/1992 |
| EP | 1547893 A1 | 6/2005 |

OTHER PUBLICATIONS

PCT International Search Report dated Mar. 31, 2012, for the International Application No. PCT/US2011/045813, International Filing Date Jul. 29, 2011.

(Continued)

*Primary Examiner* — Lee D Wilson
(74) *Attorney, Agent, or Firm* — Polster, Lieder, Woodruff & Lucchesi, L.C.

(57) ABSTRACT

A float sled comprising a body with a substantially flat upper surface, a lift plate operationally associated with the body and adapted to move from a first position in proximity to the upper surface of the body to a second position above the first position and above the body, a set of pneumatic air bag lifts associated with the lift plate to raise and lower the lift plate to various horizontal orientations with differing degrees of tilt, and an air bearing adapted to raise the body above the ground.

9 Claims, 5 Drawing Sheets

(56) References Cited

U.S. PATENT DOCUMENTS

| | | | | |
|---|---|---|---|---|
| 5,967,666 | A * | 10/1999 | Johnson | 384/12 |
| 6,184,972 | B1 * | 2/2001 | Mizutani et al. | 355/72 |
| 6,318,488 | B1 * | 11/2001 | Smith | 180/119 |
| 6,929,249 | B1 * | 8/2005 | Kim | 254/93 HP |
| 7,228,594 | B2 | 6/2007 | Smith | |
| 2004/0211947 | A1 * | 10/2004 | Cadrain et al. | 254/93 R |
| 2005/0092537 | A1 | 5/2005 | Szeliga | |
| 2012/0023724 | A1 * | 2/2012 | Peterman | 29/426.3 |

OTHER PUBLICATIONS

PCT Written Opinion of the International Searching Authority dated Mar. 31, 2012, for the International Application No. PCT/US2011/045813, International Filing Date Jul. 29, 2011.

* cited by examiner

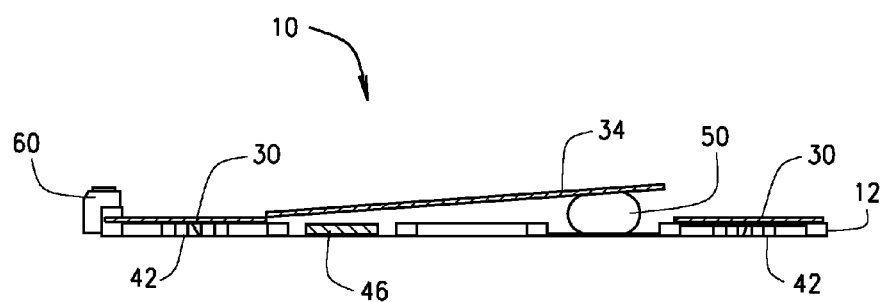
F I G. 3
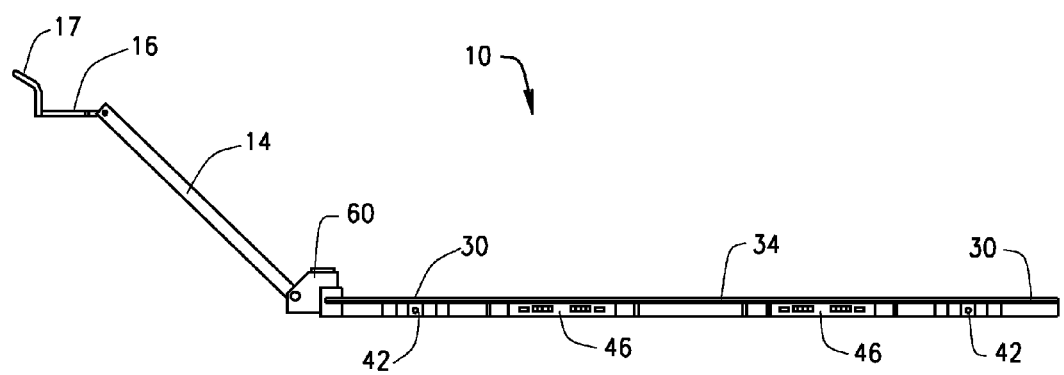
F I G. 4

HEATER SYSTEM MEDIA BED FLOAT SLED AND METHOD OF USING THE SAME

CROSS REFERENCE TO RELATED APPLICATIONS

This application derives and claims priority from U.S. provisional application 61/369,341 filed 30 Jul. 2010, which application is incorporated herein by reference.

STATEMENT REGARDING FEDERALLY SPONSORED RESEARCH OR DEVELOPMENT

Not applicable.

BACKGROUND OF THE INVENTION

This invention relates principally to a metal oven, furnace or kiln (collectively "furnace"), and more particularly to a unique float sled for the movement of heavy components removably attached to such furnace.

Some furnaces that supply molten metal for casting and other procedures utilize a regenerative configuration to improve efficiency. The typical regenerative furnace includes an enclosure having a hearth at its bottom for containing a molten metal, which is often aluminum. At one end of the furnace are two ports located above the hearth. These ports are connected to burner assemblies that operate alternately for supplying hot gases to the interior of the furnace enclosure. The temperature of the hot gasses is very high and is sufficient to maintain the metal in the hearth in a molten condition.

A typical regenerative burner system comprises at least one pair of regenerative burner assemblies. Each burner assembly has a burner head and a removable media box containing a media that serves as a heat sink. The media usually take the form of ceramic alumina spheres about one-inch in diameter. Typically, the media box is constructed of heavy gage metal and together with the media can weigh upwards of 10,000 pounds. Even a small media box will be very heavy and may weigh hundreds of pounds.

Regenerative burners operate as a duel burner unit or as a pair, e.g. burner "A" and burner "B". While burner "A" is firing, the media in its media box is releasing stored heat to the combustion air that elevates the temperature of the combustion air. The combustion air flows through the media in the media box to the burner head to mix with the gas or oil for combustion. At the same time burner "B" is being utilized as an exhaust system for the combustion hot waste gasses. An exhaust fan draws these hot waste gasses through the burner head of burner "B" and through the media in the burner "B" media box, where the hot waste gasses elevate the temperature of the media and the media bed lining. Once the exhaust gasses downstream of the media box reach a predetermined temperature, which usually takes about 40 to 60 seconds, a pair of air/exhaust duct cycling valves reverse their positions. This switches burner "A" from the burner firing into the industrial furnace to the burner exhausting out of the furnace, and simultaneously switches burner "B" from the burner exhausting to the burner firing. These air/exhaust duct cycling valves are used for switching and reversing the flow of hot gases and combustion air through the media beds.

During operation, impurities, additives and coatings that volatilize during the metal heating process in the furnace (e.g., oxidation, etc.) are picked up in the hot waste gas stream and settle out in the media boxes. As the hot waste gasses flow through the media in the media boxes of the two burner assemblies, some of the contaminants also deposit on the media. These deposits eventually clog the media. Hence, from time to time each media box is detached from the burner and taken to a remote location where the media box and the media may be cleaned and otherwise reconditioned. This is a time-consuming and difficult procedure given the size, weight and temperature of the operating media boxes and the operational temperatures of the furnace. Consequently, replacing a media box traditionally requires the use of heavy lifting equipment such as jacks and lifts. Unfortunately, in many operations the media boxes are in positions or locations that are difficult to access. While lift trucks can be used to remove and replace media boxes, the positioning and alignment of the media boxes relative to the furnace ports must be relatively precise. Lift trucks and the like are not well suited to such fine alignments and extreme care must be exercised in using a lift truck or the like, which can easily damage the media box or the furnace. Further, for some furnaces, there may be insufficient room to readily utilize a lift truck.

As will become evident in this disclosure, the present invention provides benefits over the existing art.

BRIEF DESCRIPTION OF THE DRAWINGS

The illustrative embodiments of the present invention are shown in the following drawings which form a part of the specification:

FIG. 3 is a cut away side view of the media bed float sled of FIG. 1 without the handle attached, but with an elevated lift bag and illustrating various internal features of the sled;

FIG. 4 is a cut away side view of the media bed float sled of FIG. 1 with the handle attached and rotated to approximately 45 degrees above horizontal;

Corresponding reference characters indicate corresponding parts throughout the several views of the drawings.

DETAILED DESCRIPTION

Figure 1:
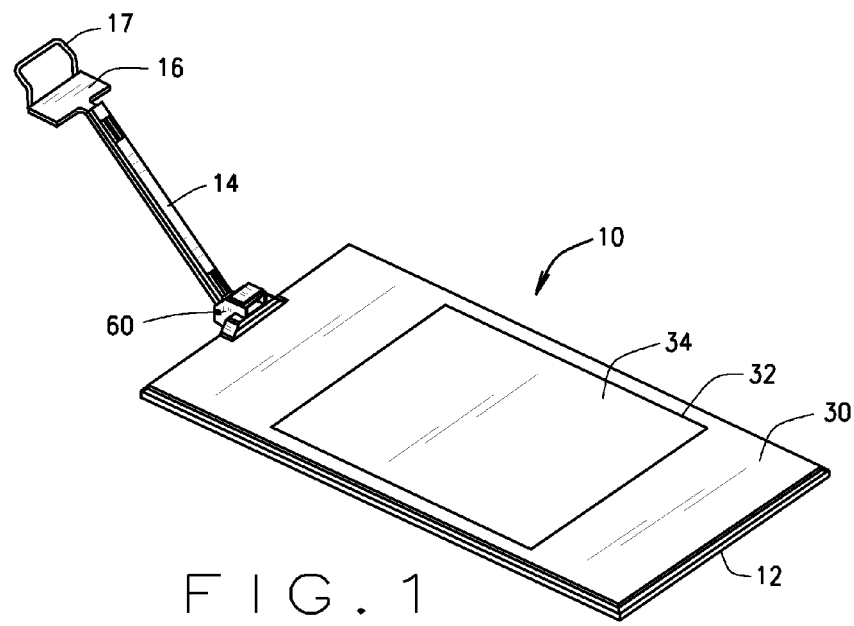
FIG. 1 is a perspective view of a media bed float sled incorporating one embodiment of the present invention.

In referring to the drawings, an embodiment of the novel heater system media bed (or media box) float sled 10 for a furnace, oven or kiln (collectively hereinafter "furnace") of the present invention is shown generally in FIGS. 1-6, where one embodiment of the present invention is depicted by way of example. The sled 10 has a frame 12, a pull arm 14 and a handle 16 with a grip 17 attached to the end of the pull arm 14. As can best be seen in FIG. 5, the frame 12 is rectangular and constructed of a multiple lengths of straight heavy gage metal "box" tubing, preferably steel, welded together to provide the foundation for the sled 10. The frame 12 has a flat rectangular perimeter structure 18 and a flat cross-member structure 20 within the perimeter structure 18. The perimeter structure 18 has two opposing and parallel short sides 22 joined at right angles at their ends to two opposing and parallel long sides 24. The perimeter structure 18 is constructed to form a continuous and interconnected hollow conduit about the frame 12. This can be seen in FIG. 2, where arrows A depict the flow of compressed air within the hollow center of the perimeter structure 18. Indeed, each weld at the corners of the perimeter structure 18 is formed so as to securely seal the interior of the structure's hollow tubing.

Referring again to FIG. 5, the cross-member structure 20 comprises a central brace 26 and a series of cross braces 28. The central brace 26 is parallel to and equally spaced between the long sides 24 of the perimeter structure 18 and extends between and is welded to and rigidly joins the short sides 22 of the perimeter structure 18. Four parallel and similarly spaced pairs of the cross braces 28 are welded to and rigidly join the central brace 26 to the long sides 22 of the perimeter structure 18. Each pair of the cross braces 28 are collinear, with one cross brace 28 of each pair extending from the one side of the central brace 26 to one of the long sides 24, and the other cross brace 28 of that pair extending from the other side of the central brace 26 to the opposite the long side 24. In this way, the frame 12 takes on the appearance of a window having ten similarly sized rectangular panes P1-P10. While the cross-member structure 20 is welded to the perimeter structure 18 at multiple junctures and is likewise constructed of rectangular-shaped heavy gage metal "box" tubing, none of the junctures between the structures 18 and 20 breach the interior of the perimeter structure 18. Hence, the interior of the perimeter structure 18 is isolated from the interiors of the central brace 26 and each of the cross braces 28. The interior of the central brace 26 acts as a conduit for cables, compressed air hoses and the like.

Returning to FIG. 1, a rectangular metal top plate 30 is rigidly attached to the upper surface of the frame 12, and has a rectangular hole 32 formed in its center. The outer perimeter of the top plate 30 is essential the same as the outer perimeter of the frame 12, such that little or no portion of the top plate 30 overlaps the frame 12. In addition, the top plate 30 and the hole 32 are configured such that the top plate 30 entirely covers each of four corner panes P1, P2, P9 and P10 of the frame 12 while exposing the six center panes P3-P8 of the frame 12. A rectangular metal lift plate 34 is positioned in the center of the upper surface of the frame 12. Both plates 30 and 34 are constructed of heavy gage rigid metals, and preferably steel, both having the same thickness. The lift plate 34 is shaped to fit freely yet closely within the hole 32. Thus, the hole 32 in the center of the top plate 30 is configured to receive the lift plate 34 such that the plates 30 and 34 form a generally uniform flat upper face when the lift plate 34 is placed into the hole 32.

Figure 2:
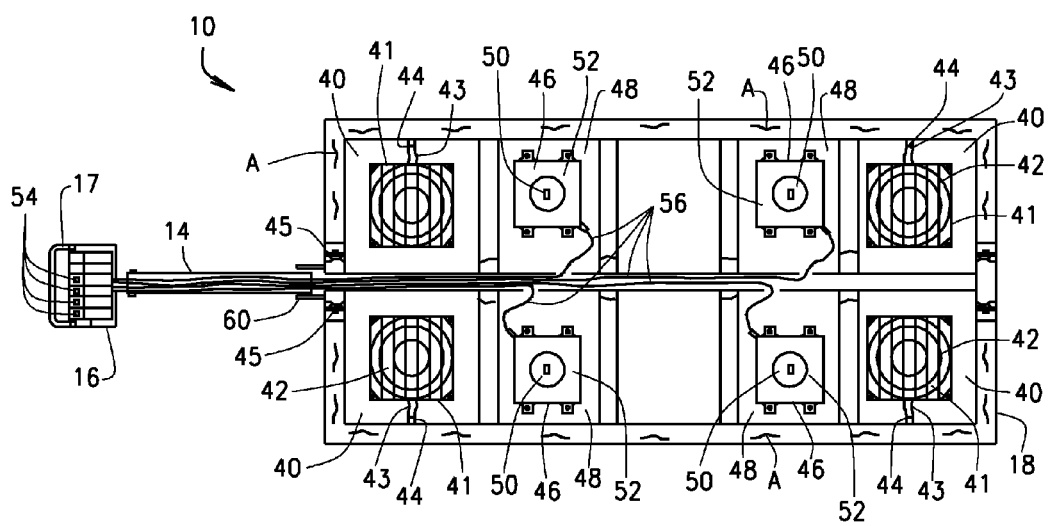
FIG. 2 is a plan view of the media bed float sled of FIG. 1 exposing various internal features of the sled.
Figure 5:
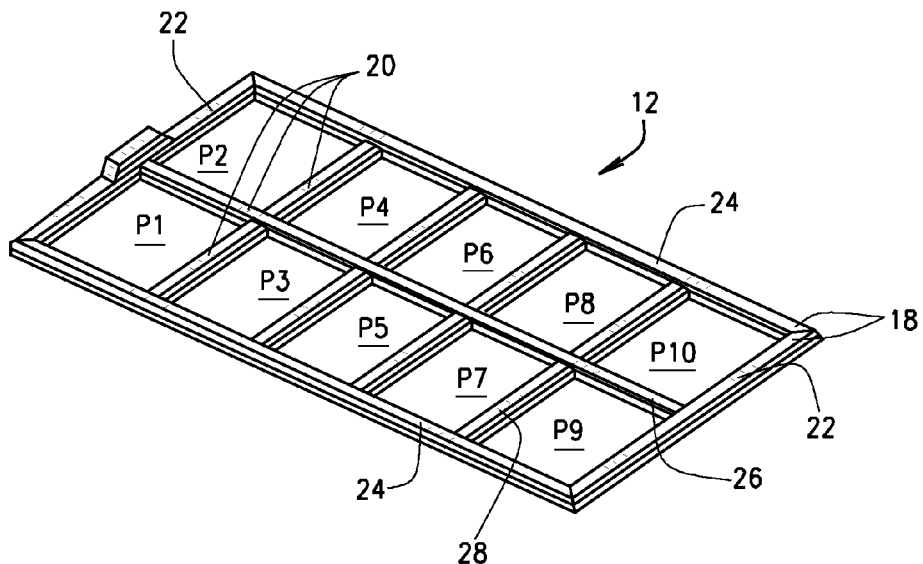
FIG. 5 is a perspective view of the hollow frame of the media bed float sled of FIG. 1.
Figure 6:
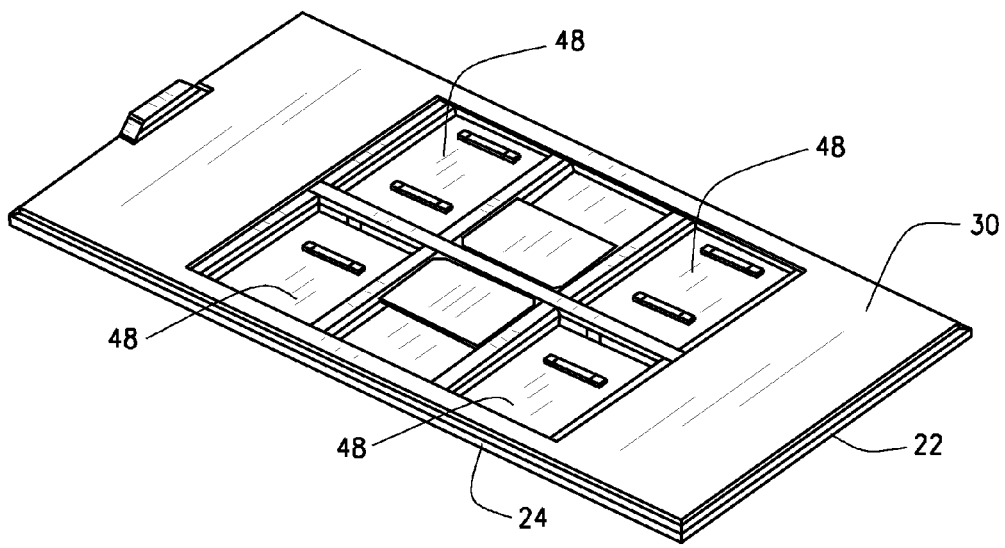
FIG. 6 is yet another perspective view of the media bed float sled of FIG. 1 partially constructed.

Turning to FIG. 2, in each of the four corner panes P1, P2, P9 and P10 under the top plate 30, a spacing plate 40 is rigidly and horizontally mounted to the frame 12. Each of the spacing plates 40 is adapted to house an air bearing 42, which is rigidly, yet removably, mounted in a horizontal orientation in the spacing plate 40 below the top plate 30 in each of the panes P1, P2, P9 and P10. Each of air bearings 42 faces downward away from the top plate 30 so as to direct compressed air supplied to the air bearing downward toward the ground under the sled 10. Further, the thickness of the spacing plate 40 is such that the bottom of each air bearing 42 extends just slightly below the bottom surface of the frame 12 so as to enable the air bearings to properly operate. Hoses 43 operatively connect each of the air bearings 42 to air ports 44 positioned along the inner surfaces of the longs sides 24 of the frame 12. The ports 44 open to the interior of the perimeter structure 18 of the frame 12. In this way, the compressed air A directed into the hollow perimeter structure 18 of the frame 12 provides the compressed air supply required to operate each of the air bearings 42. Compressed air is supplied to the interior of the perimeter structure 18 of the frame 12 through either of the connectors 45 positioned in the structure 18 near the pull arm 14. Of course, the connectors 45 or other additional such compressed air supply connectors can be positioned at any convenient position along the perimeter structure 18, or along the pull arm 14 or on the handle 16 with additional hosing that leads to and supplies the structure 18.

Under the lift plate 34 in each of the four panes P3, P4, P7 and P8, a compressed air bag 46 is mounted on top of a plate 48 rigidly mounted in a horizontal orientation to the frame 12. A compressed air bag 46 is mounted on top of each of the plates 48. Each of the plates 48 is positioned within the panes P3, P4, P7 and P8, such that the a gap is formed between the underside of the lift plate 34 and the top side of the plates 48 having sufficient thickness for the compressed air bags 46 to set when deflated between the plates 34 and 48 without lifting the plate 34 above the plate 30. Each of the four air bags 46 has an actuation bellows or sack 50 that is directed upward away from the mounting plates 48. The plates 48 and air bags 46 are configured and situated in the frame 12 so as to have no pressurized engagement with the lift plate 34 when the air bags 46 are fully deflated, but to engage the lower surface of the lift plate 34 when the air bags 46 initially begin to inflate. In this way, the lift plate 34 can rest within the hole 32 in the top plate 30, and nearly all of the vertical lift available through the air bags 46 can be applied to the lift plate 34 to raise the lift plate 34 above the top plate 30 (see FIG. 3 showing one end of the lift plate 34 raised by an inflated actuation sack 50). Alternatively, the plates 48 and air bags 46 can be configured and situated in the frame 12 so as to have limited engagement with the lift plate 34 when the air bags 46 are fully deflated such that the lift plate 34 will rest within the hole 32 in the top plate 30.

Additionally, a set of retention springs (not shown) can be attached to the plate 34 to the frame 12 below the plate 30 to hold the plate 34 in alignment with the hole 32 when the plate 34 is raised or lowered by the air bags 46. Hence, while the plate 34 is otherwise free floating atop the air bags 46 when the air bags 46 are inflated, the retention springs ensure that the plate 34 rises above the hole 32 upon inflation of the air bags 46 and returns to seat in the hole 32 when the air bags 46 deflate.

Each of the air bags 46 has a corresponding low profile electric air compressor 52 mounted in the sled 10 that inflates and deflates the actuation sack 50. The compressors 52 are positioned in the panes P3, P4, P5 and P6, each in proximity to its corresponding air bag 46. The compressors 52 are selected, in part, by their height such that when mounted in the sled 10, the compressors 52 must fit below the plate 34 positioned in the hole 32. The operation of each compressor 52 is controlled by an electric three-way switch 54 located on the upper surface of the handle 16 for ease of operation. An electric cable 56 operatively connects each compressor 52 with its respective three-way switch 54. The actuation sacks 50 inflate when the three-way switch 54 is turned to a first position, deflate when the three-way switch 54 is turned to a second position, and hold pressure when the three-way switch 54 is turned to a third position. Hence, each of the actuation sacks 50 can be independently inflated and deflated to any level of inflation from full deflation to full inflation, by manipulation of the three-way switch 54 on the handle 16. For compactness and protection, the compressed air hoses 56 are threaded through the interior of the handle 14 and through the interior of the central brace 26 of the frame 12.

A pivot joint 60 rotationally attaches one end of the pull arm 14 to the frame 12 midway along the length of one of the short sides 22, while the handle 16 is rigidly attached to the opposite end of the pull arm 14. The pivot 60 allows for adjustment of the pull arm 14 for ease of use and for storage. The sled 10 is therefore very compact and has a very low profile, which allows for the positioning the sled 10 under equipment having very little clearance above the flooring.

Figure 7:
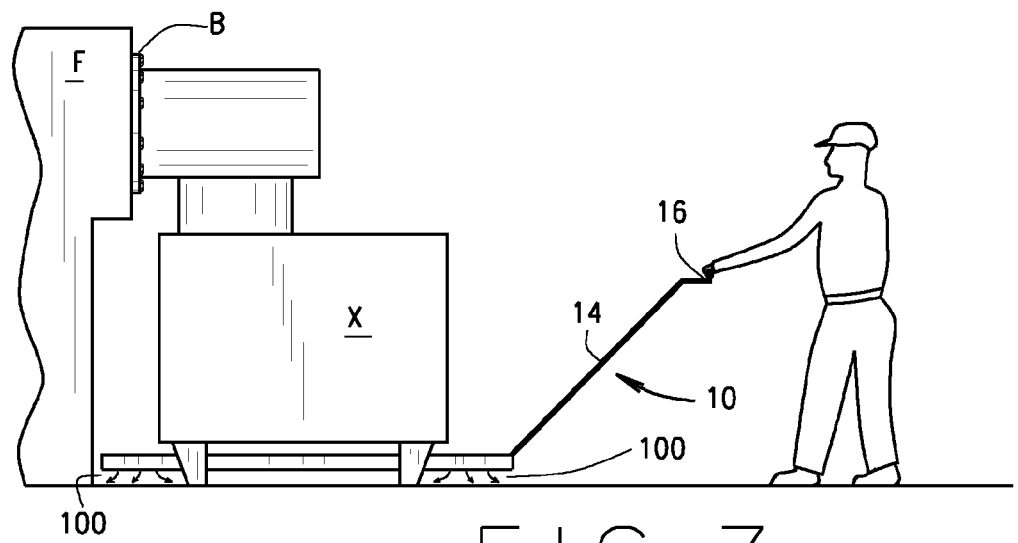
FIG. 7 is a side view of a media bed float sled of FIG. 1 floating atop the ground by use of its air bearings and being positioned below a media box attached to a furnace.

Referring now to FIGS. 7-11, the implementation and use of the novel sled 10 is depicted. As can be appreciated, when it is desirable to move a heavy component X, such as for example a media box, that extends laterally from a furnace F, away from attachment to the furnace F at the flange B, particularly where the furnace component X must be lifted in a vertical or angular fashion before being moved laterally away from the furnace F, the sled 10 can be moved into place underneath the component X (FIG. 7).

Figure 8:
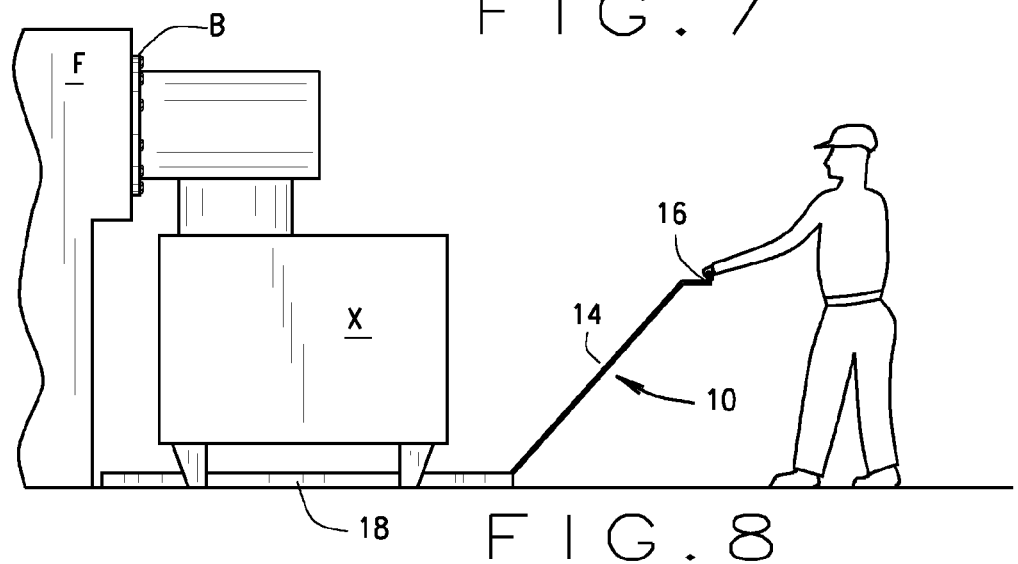
FIG. 8 is a side view of the media bed float sled of FIG. 7 lowered to the ground below the media box.
Figure 9:
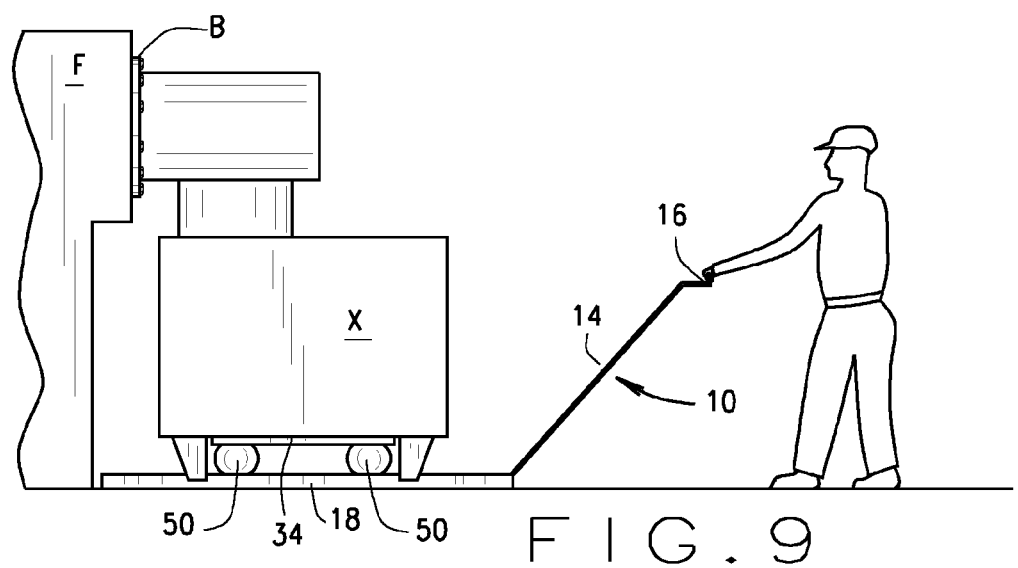
FIG. 9 is a side view of the media bed float sled of FIG. 7 with its actuation bags inflated to raise the media box off of the ground to enable the ready detachment of the media box from the furnace.
Figure 10:
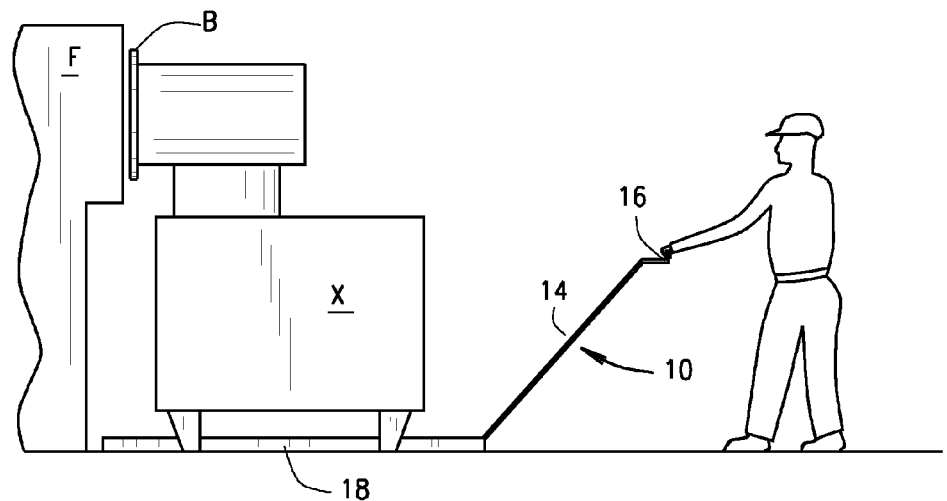
FIG. 10 is a side view of the media bed float sled of FIG. 7 lowered to the ground below the media box after the media box has been detached from the furnace.

The initial placement of the sled 10 can be accomplished by floating the sled 10 in place under the component X with the activation of the air bearings 42, directing compressed air 100 against the ground, or through use of other mechanical means. Thereafter, the compressed air 100 is shut off and sled 10 is allowed to rest upon the floor beneath the sled 10 under the component X (FIG. 8). The air bags 46 are then inflated to raise the lift plate 34 under the furnace component X until the lift plate 34 fully engages the underside of the component X (FIG. 9). It is also an option to lift the component X above the floor at this stage. Because the underside of the furnace component X may not be level, each of the air bags 46 is independently controlled so that the lift plate 34 may be moved to a position that is not parallel to the top plate 30 or the ground upon which the sled 10 is resting, but that is in full contact with the underside of the component X. The air bags 46 are then manipulated, independently if necessary, to lift the furnace component X out of engagement with the furnace F at the flange B. At this juncture, attachment such as bolts and latches, used to secure the component X to the furnace F at flange B and wedged in place due to the weight of the component X, can easily be removed or loosened to free the component X from the furnace F.

Figure 11:
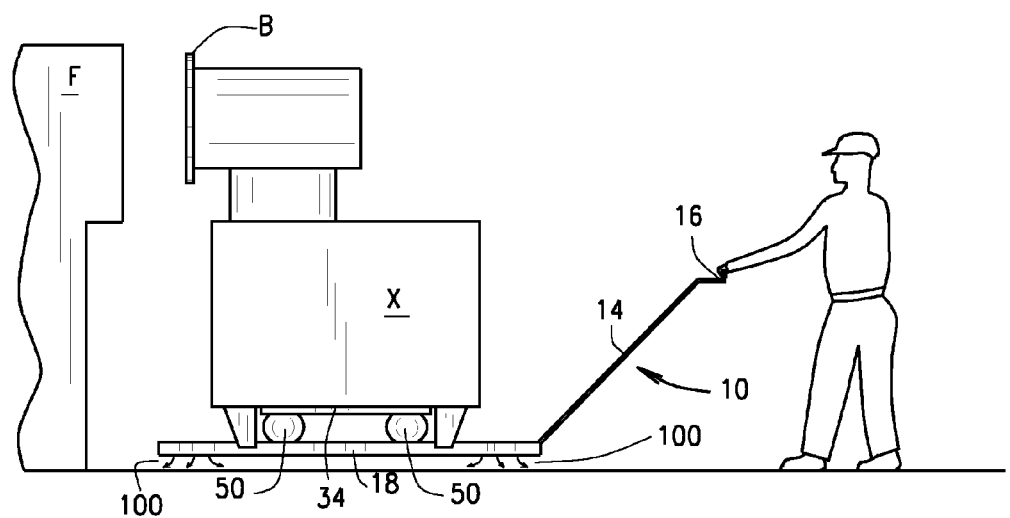
FIG. 11 is a side view of the media bed float sled of FIG. 7 raised above the ground by its air bearings while supporting the media box atop the sled to enable ready lateral movement of the media box.

The air bags 46 are then deflated (FIG. 10) to lower the component X resting on the lift plate 34 until the lift plate 34 is resting upon the frame 12. The air bearings 42 are then engaged to direct compressed air 100 against the ground and raise the sled 10 which will then be supporting the furnace component X atop the lift plate 34 (FIG. 11). As depicted in FIG. 11, the air bags 46 can also be utilized to partially raise or level the component X atop the sled 10. The furnace component X can then be moved about easily atop the sled 10 to a desired location. Of course, these steps can be reversed to place the furnace component X onto the furnace F. Moreover, while the component X depicted in FIGS. 7-11 rests upon the ground, it is fully contemplated that the novel sled 10 can be used in the same manner described herein to remove a component X attached to a furnace F that extends laterally from the furnace F, but does not contact the ground.

While I have described in the detailed description a single configuration that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel media bed float sled 10 of the present invention can be arranged in a number of other and related varieties of configurations without expanding beyond the scope of my invention as set forth in the claims.

For example, instead of electric compressors 52 to inflate the actuation sacks 50, compressed air may be directly supplied to each of the sacks 50. Also, alternate lift devices, such as for example linear actuators or hydraulic cylinders, may be used instead of the air bags 46, so long as the lift devices are capable of low profile placement on the sled 10 and can operate as the air bags 46 as disclosed herein. Moreover, there may be fewer than or more than four of the air bags 46 to lift the lift plate 34, so long as the number is sufficient to enable the sled 10 to operate as disclosed herein. Likewise, there may be fewer than or more than four of the air bearings 42, so long as the number is sufficient to enable the sled 10 to operate as disclosed herein. Further, insulation, such as for example high temperature pads, can be placed upon or attached to those portions of the sled 10 that may be exposed to high temperatures that could otherwise damage one or more of the components of the sled 10 without such insulation. More than one handle 14 may be attached to the sled 10, and the handle 14 may be attached to the sled 10 at any of a variety of locations on the sled 10 nearly without limitation. The handle 14 need not be pivotally attached to the sled 10, or may be pivotally attached with greater or less angular rotation, or may even be universally attached to the sled 10. The shape of the sled 10, the lift plate 34 and the frame 12, need not be rectangular in shape, but may be other shapes, such as for example, oval, octagonal or square. The sled 10 may be of various vertical thicknesses.

Additional variations or modifications to the configuration of the novel heater system media bed float system 10 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of my invention.

What is claimed is:

1. A float sled comprising:
   a. a body with a substantially flat upper surface;
   b. a lift plate operationally associated with the body and adapted to move from a first position in proximity to the upper surface of the body to a second position above the first position and above the body;
   c. an air bearing adapted to raise the body above the ground; and
   d. a fluid lift associated with the lift plate to raise and lower the lift plate.

2. The float sled of claim 1, wherein the fluid lift comprises a pneumatic air bag.

3. A float sled comprising:
   a. a body with a substantially flat upper surface;
   b. a lift plate operationally associated with the body and adapted to move from a first position in proximity to the upper surface of the body to a second position above the first position and above the body;
   c. an air bearing adapted to raise the body above the ground; and d. three lifts associated with the lift plate to raise and lower the lift plate.

4. The float sled of claim 3, wherein each lift is positioned below a different portion of the lift plate.

5. A float sled comprising:
a. a body with a substantially flat upper surface;
b. an air bearing adapted to raise the body above the ground;
c. a lift plate operationally associated with the body, having a substantially flat upper surface; and
d. a lift operationally associated with the lift plate and adapted to move the lift plate from a first position in proximity to the upper surface of the body to a second position above the first position and above the body;
wherein the lift is configured to raise the lift plate to an angular orientation above the upper surface of the body in which the upper surface of the lift plate corresponds to the angular orientation of the underside of a load to be moved by the sled.

6. The float sled of claim 5, wherein one of the lifts is pneumatic.

7. The float sled of claim 6, wherein one of the lifts comprises an air bag.

8. The float sled of claim 5, wherein each lift is independently controlled.

9. The float sled of claim 5, wherein one of the lifts is positioned below the lift plate.

\* \* \* \* \*